United States Patent [19]

Birchfield et al.

[11] Patent Number: 4,805,924
[45] Date of Patent: Feb. 21, 1989

[54] INSTRUMENT PANEL STRUCTURE FOR AN AUTOMOTIVE VEHICLE

[75] Inventors: James M. Birchfield, Livonia; Ralph A. Molinaro, Grosse Isle; Lynn K. Tilly, Lake Orion, all, Mich.

[73] Assignee: Chrysler Motors Corporation, Highland Park, Mich.

[21] Appl. No.: 133,982

[22] Filed: Dec. 16, 1987

[51] Int. Cl.$^4$ ............... B60K 37/00; B60R 21/04
[52] U.S. Cl. ............................ 280/752; 180/90
[58] Field of Search ............... 280/752, 751; 180/90; 296/70

[56] References Cited

U.S. PATENT DOCUMENTS 3,876,228  4/1975  Hawkins et al. ............... 180/90
4,105,223  8/1978  Oda et al. ...................... 280/752

Primary Examiner—David M. Mitchell
Assistant Examiner—Ross Weaver
Attorney, Agent, or Firm—Edward A. Craig

[57] ABSTRACT

An instrument panel structure is provided for an automotive vehicle. The instrument panel structure includes an energy absorbing panel member fabricated of a relatively rigid impact resistant material. The panel member has an upper portion adapted to accept head impacts of a vehicle occupant and a lower portion adapted to accept knee impact of a vehicle occupant. The upper portion is weakened with respect to the lower portion by providing spaced apart protuberances on the surface on the reverse side of the surface designed to be impacted so that it will give more readily under impact than does the lower portion.

4 Claims, 1 Drawing Sheet

INSTRUMENT PANEL STRUCTURE FOR AN AUTOMOTIVE VEHICLE

BACKGROUND OF THE INVENTION

1. Field of the Invention

An instrument panel structure for a vehicle is provided. The panel structure includes an energy absorbing panel member fabricated of a relatively rigid impact resistant resinous material modified so that one portion gives more readily under impact than do other portions.

2. Prior Art

Increasing attention has been paid in recent years to the provision of instrument panels for automotive vehicles which will tend to reduce injury to vehicle occupants as a consequence of impact with the instrument panel on the occurrence of sudden decelerations caused by accidents or rapid braking action.

Instrument panels are subject to two different types of vehicle occupant impact. One type of impact involves doubling over of the occupant whereupon his head will impact the instrument panel. Head injuries are, of course, very serious and it is desired to provide an instrument panel which, when impacted by an occupant's head, will give and absorb energy of impact in a manner to ease impact forces.

The other type of impact is with the vehicle occupant's knees against the lower portion of the instrument panel. While it is, of course, desirable to protect the knees from injury, there is another problem associated with such impact. The lower portion of the body is heavier than the upper portion. When the knee contacts the instrument panel it means that the lower portion of the body is moving forwardly. It is desired to prevent such forward movement within the constraints of minimizing knee injury in order to protect the vehicle occupant from more severe injury which may be caused by such forward movement of the lower body portion. Therefore, the lower portion of the instrument panel should not give as much as the upper portion.

The difference in the two types of impacts has resulted in an instrument panel designed problem. If the panel is constructed so as to give under lower impact forces so as to protect the head, it will also give under relatively low knee impact forces which is undesirable. The reverse proposition is true, that is, if the instrument panel is made more rigid so as to not give under knee impact forces, it will not give sufficiently under head impact forces.

One solution to this problem which has been proposed is to weaken the joint interconnecting the upper and lower portions of the instrument panel so that the instrument panel will, in effect, bend under head impact forces. A reinforcing element may then be provided on the lower instrument panel portion to prevent movement of the lower portion. The various ways this might be done present manufacturing problems which have been difficult to overcome.

In accordance with the present invention, the lower portion of the instrument panel is made sufficiently strong so as to properly resist knee impact forces. The upper portion of the panel is embossed on the reverse side to result in a plurality of protuberances which are spaced apart from each other. This has weakened the upper portion of the panel sufficiently to permit it to give under the head impact forces in a desired manner. The result is a one-piece instrument panel structure which serves both the needs of energy absorbing for head impact and energy absorbing for knee impact.

SUMMARY OF THE INVENTION

An instrument panel structure is provided for an automotive vehicle. The panel structure includes an energy absorbing panel member fabricated of a relatively rigid impact resistant resinous material. The panel member includes an upper portion and a lower portion. The two portions are interconnected. The upper portion has an outer surface adapted to accept vehicle occupant head impact and the lower portion has an outer surface adapted to accept vehicle occupant knee impact. The upper portion has an inner surface. A plurality of spaced apart protuberances are provided on the inner surface. The protuberances result in weakening of the upper portion when it is subjected to vehicle occupant head impact on the outer surface thereof. The protuberances cause the upper portion to more readily give under such impact forces and absorb the energy of impact in a manner tending to reduce head injury.

The lower portion has an inner surface and an outer surface, the inner surface of which is protuberance-free whereby it is more resistant to giving under impact so that when the lower portion is subjected to vehicle occupant knee impact on the outer surface thereof it will impede forward movement of a vehicle occupant.

A plurality of spaced apart protuberances may also be provided on the outer surface area of the lower portion adjacent to the upper portion to weaken this area of the lower portion so that it will bend more readily upon vehicle occupant head impact with the upper portion. The instrument panel member is preferably fabricated as a single unit whereupon protuberances may be provided on the outer surface of the interconnecting portion to assist in the weakening process. The purpose of this weakening is to facilitate ready bending of the upper portion upon vehicle occupant head impact.

In a preferred embodiment, the panel member is about 4/32 of an inch thick between the outer and inner surfaces and the protuberances are about 1/32 of an inch thick. The protuberances cover a greater surface area than do the spaces therebetween to result in greater stress concentration in the spaces between the protuberances.

IN THE DRAWING

DETAILED DESCRIPTION OF A PREFERRED EMBODIMENT

Figure 1:
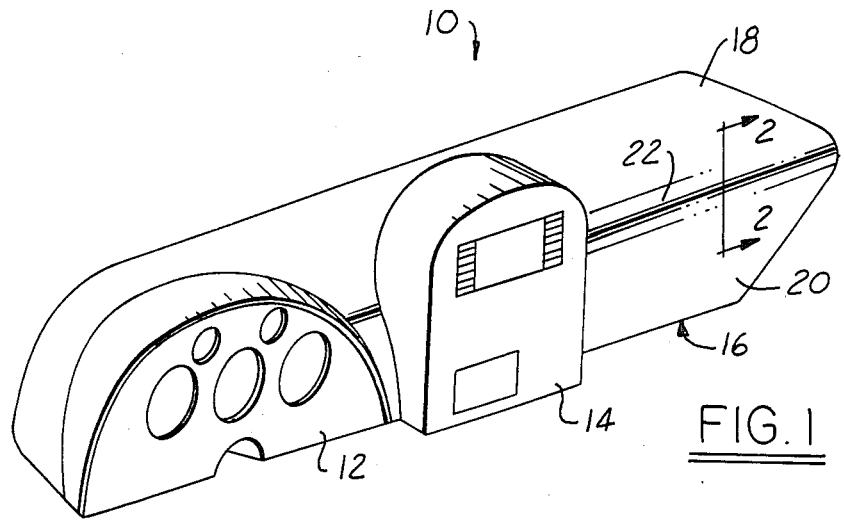
FIG. 1 is a view in perspective of an instrument panel structure of an automotive vehicle forming a preferred embodiment of the present invention.

As will be noted in FIG. 1, a typical instrument panel structure 10 is illustrated. The instrument panel structure 10 includes an instrument cluster portion 12 provided in front of the driver, portion 14 in the center thereof which may accommodate accessories such as a radio and heater, and a portion 16 which is on the passenger side and may include a glove box structure.

The portion 16 includes an upper portion 18 and a lower portion 20 interconnected by portion 22.

Figure 2:
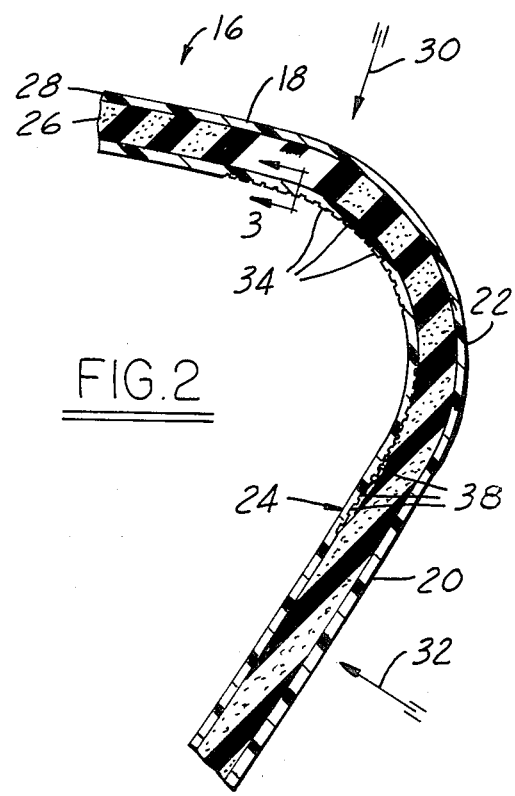
FIG. 2 is a sectional view taken substantially along the line 2—2 of FIG. 1 looking in the direction of the arrows.

Referring to the FIG. 2, it will be noted that the instrument panel structure is illustrated as a conventional sandwich structure including an energy absorbing panel member 24, a center foam structure 26 and an outer ornamental vinyl sheet 28. The foam material may be, for example, about onehalf inch thick and may be fabricated of a suitable material such as foam urethane or foam vinyl.

The energy absorbing panel member 24 is fabricated of a relatively rigid impact resistant resinous material such as ABS or polycarbonate. The upper and lower sections of the panel 24 are interconnected. Preferably, the panel member 24 is fabricated as by injection molding as a single unit.

As will be noted, the upper portion 18 of the instrument panel structure is oriented generally horizontally while the lower portion 20 is oriented generally vertically. However, these orientations may be varied. The upper portion 18 will receive a head impact in the direction of arrow 30 in the event of forward and downward movement of a vehicle occupant's upper body. The instrument structure portion 20 will receive vehicle occupant knee impact in the direction of arrow 32 upon forward movement of a vehicle occupant which may, of course, occur in the event of an accident. It i desired in accordance with the present invention to have the upper portion 18 give more readily than the lower portion 20. The reason for this is to reduce possible head injury by making the portion 18 give and absorb energy but to reduce more serious body injury to the lower portion of a vehicle occupant by making the lower portion 20 more resistant to giving thereby impeding motion of the lower portion of the vehicle occupant's body.

In order to accomplish this, the inner surface of the upper portion of the panel member 24 is provided with a plurality discrete unconnected of protuberances 34 in the area which may be impacted by a vehicle occupant's head.

Figure 3:
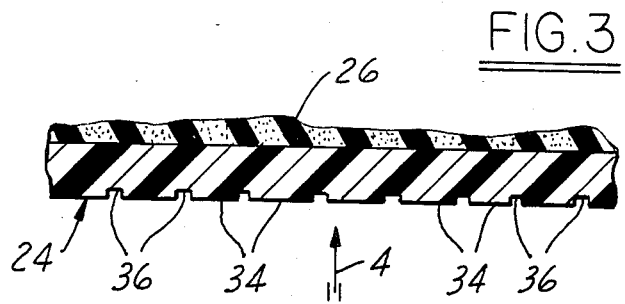
FIG. 3 is a sectional view taken substantially along the line 3—3 of FIG. 2 looking in the direction of the arrows.
Figure 4:
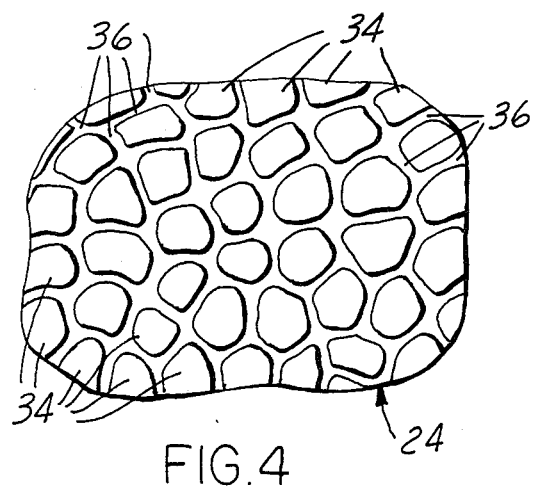
FIG. 4 is a plan view taken in the direction of arrow 4 of FIG. 3.

As may be more clearly noted in FIGS. 3 and 4, the protuberances 34 are spaced apart on the inner surface of the panel member. Preferably, the protuberances are relatively closely spaced together so that the protuberances 34 take up a much greater surface area than do the spaces 36 therebetween. The ratio of the thickness of protuberances to the thickness of the panel member is about 1:4. For example, in a preferred embodiment, the panel member 24 had a thickness of about 4/32 of an inch between the inner and outer surfaces and the protuberances had a thickness of about 1/32 of an inch. The protuberances were about ¼ inch wide and the spaces ranged from about 1/32 to 1/16 inch in width.

The protuberances 34 and the spaces therebetween result in weakening of the panel member when impacted in the direction of arrow 30. This results from the fact that the presence of the spaced apart protuberances results in reducing the strength in tension of the panel portion to which they are applied thus resulting in the panel structure giving easier than it otherwise would when impacted. As will be noted, the inner surface of the lower portion of the panel member 24 is protuberance-free. Thus the lower portion will have its normal impact resistance and will not give as easily as the upper portion to thereby impede forward movement of the vehicle occupant when the occupant's knee impacts upon the instrument panel structure. In tests which have been conducted, it has been found that the presences of the protuberances decreases the tensile strength of the area affected but does not seriously affect the compressive strength.

Protuberances 38 are also illustratively provided on the outer surface area of the lower portion of the panel member 24 adjacent to the upper portion of the panel member to to weaken this area of the lower portion in tension as shown in FIG. 2. The tensile strength of this area will be reduced when placed in tension by an impact on the upper panel portion in the direction of arrow 30 thus permitting the upper portion of the panel member 24 to bend more easily but will not result in this portion bending more easily when impacted in the direction of arrow 32 on the lower portion for the reason that this impact force would cause the area having protuberances 38 to be under compression thus preserving the impact resistance of the lower portion of the instrument panel structure.

Measurements conducted using the Gardener Impact Test have shown that provision of the protuberances results in reducing tensile impact resistance as opposed to the portion having no protuberances by a factor of about four while at the same time the protuberances do not seriously affect the strength in compression.

We claim:

1. An instrument panel structure for an automotive vehicle including an energy absorbing panel member fabricated of a relatively rigid impact resistant resinous material, the panel member having an upper portion and a lower portion interconnected to each other, the upper portion having an outer surface adapted to accept vehicle occupant head impact and the lower portion having an outer surface adapted to accept vehicle occupant knee impact, the upper portion having an inner surface, a plurality of discrete spaced apart unconnected protuberances on said inner surface, said protuberances resulting in weakening of said upper portion when subjected to vehicle occupant head impact on the outer surface thereof causing said outer portion to more readily give under such impact forces and absorb the energy of impact in a manner tending to reduce head injury, said lower portion having a protuberance-free inner surface whereby it is more resistant to giving under impact than the upper portion so that when subjected to vehicle occupant knee impact on the outer surface thereof it will impede forward movement of a vehicle occupant.

2. An instrument structure as set forth in claim 1, further characterized in that a plurality of spaced apart protuberances are present on the outer surface area of the lower portion adjacent to the upper portion to weaken this area of the lower portion in tension so that the upper portion will bend more readily upon vehicle occupant head impact with the upper portion.

3. An instrument panel structure as set forth in claim 1, further characterized in that the panel member is about 4/32 of an inch thick between the inner and outer surfaces and the protuberances are about 1/32 nd of an inch thick.

4. An instrument panel structure as set forth in claim 1, further characterized in that the protuberances cover a greater surface area than do the spaces therebetween.

* * * * *